United States Patent [19]

Niezen

[11] Patent Number: 4,579,050

[45] Date of Patent: Apr. 1, 1986

[54] COFFEE MAKER

[75] Inventor: Barteld Niezen, Groningen, Netherlands

[73] Assignee: U.S. Philips Corporation, New York, N.Y.

[21] Appl. No.: 639,165

[22] Filed: Aug. 9, 1984

[30] Foreign Application Priority Data

Apr. 2, 1984 [NL] Netherlands .......................... 8401031

[51] Int. Cl.⁴ .............................................. A47J 31/00
[52] U.S. Cl. ......................................... 99/295; 99/307
[58] Field of Search ................. 99/295, 279, 280, 281, 99/282, 283, 300, 304, 307; 426/433

[56] References Cited

U.S. PATENT DOCUMENTS

| 4,083,295 | 4/1978 | Hollingsworth | 99/295 |
| 4,331,067 | 5/1982 | Mysicka | 99/295 |
| 4,382,402 | 5/1983 | Alvarez | 99/295 |

Primary Examiner—Robert W. Jenkins
Attorney, Agent, or Firm—Rolf E. Schneider

[57] ABSTRACT

A coffee maker comprises a housing and a water tank formed as a unitary plastic part, the housing having a horizontal base and a wall extending perpendicularly to the base, the water tank extending horizontally from the upper portion of such wall. Included are a filter device and a flow heater for heating water from the water tank and feeding the same to the filter device. Provision is made for mounting the flow heater on the rear side of the housing wall; and a cover is provided for enclosing the mounted flow heater.

1 Claim, 3 Drawing Figures

COFFEE MAKER

This invention relates to a coffee maker comprising a housing, a water tank, a filter device, and a flow heater for heating water and feeding it from the water tank to the filter device, which housing has a horizontal base and a housing wall which extends substantially perpendicularly to said base, the water tank being supported by the housing.

Such a coffee maker is disclosed in published Dutch application No. 8200176. In this known coffee maker the flow heater is U-shaped and is arranged around the filter device in the housing and the water tank is mounted on top of the housing.

The present invention aims at improving the construction of such a coffee maker.

According to the invention the coffee maker is characterized in that the housing and the water tank are constructed as one plastic part, the flow heater being secured to the rear side of the upright housing wall.

This arrangement considerably simplifies the assembly of the appliance and thereby reduces its manufacturing cost. The entire flow heater unit with its electrical connections and wiring can be manufactured, assembled and tested separately. Subsequently, such unit can be simply mounted against the rear side of the upright housing wall, after which the unit is enclosed by a rear cover.

A preferred embodiment is characterized further in that the water tank is substantially U-shaped, the limbs of the U embracing the filter device. This leads to a reduced overall height.

The invention will now be described in more detail, with reference to the accompanying drawings, in which.

Figure 1:
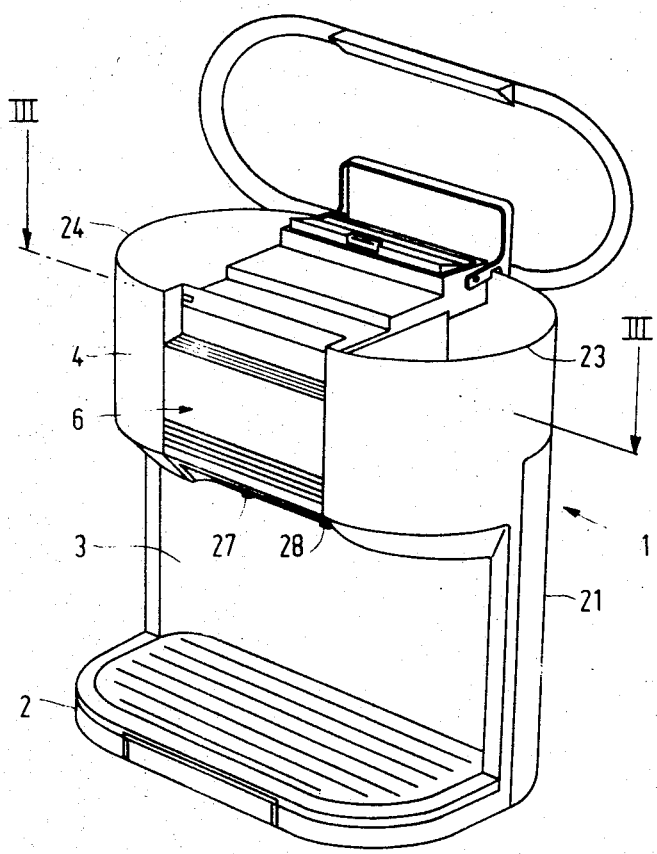
FIG. 1 is a perspective view of a coffee maker in accordance with the invention.
Figure 2:
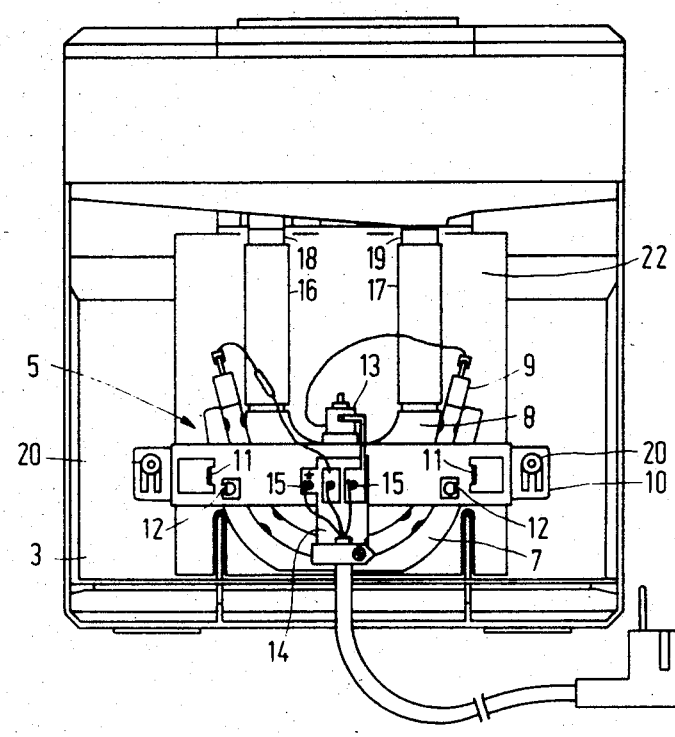
FIG. 2 shows on an enlarged scale the rear side of the coffee maker of FIG. 1, from which the rear cover has been removed.
Figure 3:
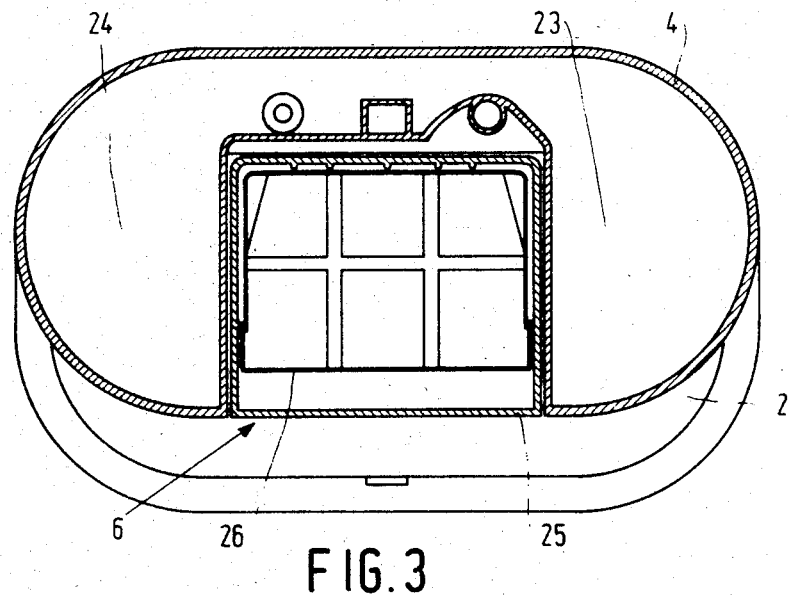
FIG. 3 is a sectional view on a further enlarged scale of the coffee maker taken on the line III—III in FIG. 1.

The coffee maker has a housing 1, which comprises a horizontal base 2 and a housing wall 3 which extends perpendicularly to said base, and a water tank 4 supported by said housing. In accordance with the invention the housing and the water tank are manufactured as a single or unitary plastic part, the water tank, as shown in FIGS. 1 and 2, extending horizontally from the upper portion of the housing wall. A flow heater 5 is secured to the rear side of the upright housing wall 3. The flow heater heats the water and feeds it from the water tank to a filter device 6.

The flow heater 5 comprises an aluminium casting 7 in which a water duct 8 is formed and in which a heating element 9 is mounted. The casting 7 is secured to a bracket 10. For this purpose lugs 11 and 12 are partly blanked out of the bracket and are subsequently bent up. By means of these lugs the casting is secured to the bracket. A thermal cut-out 13 is secured to the casting so as to be in proper thermally conductive contact therewith. Further, an electrically insulated support 14 is secured to the bracket and carries the electrical connection terminals 15. The flow heater thus prepared, including the electrical wiring and the flexible connecting tubes 16 and 17, can be mounted in the coffee maker as one unit. For this purpose the connecting tubes 16 and 17 are slid onto the pipe ends 18 and 19 respectively, after which the bracket 10 is secured to threaded posts 20. The posts also serve for mounting the rear cover 21 (see FIG. 1). This method of mounting is very simple, and minimizes the manufacturing cost. Moreover, a plate 22 is arranged between the flow heater 5 and the upright housing wall 3 to shield the live parts of the upright housing wall.

In accordance with a further characteristic feature of the invention the water tank 4 is U-shaped, the limbs 23 and 24 of the U embracing the filter device 6. Thus the overall height of the present coffee maker is reduced in comparison with known coffee makers, in which the water tank is arranged on top of or adjacent the filter device. The filter device comprises a filter-tray holder 25 which can be slid into the housing between the limbs of the water tank and which can hold a filter-tray 26. The filter-tray holder comprises two discharge openings 27 and 28 which are situated at such a distance from each other that at option one cup may be placed beneath the two discharge openings or two cups may be placed adjacent one another, one beneath each discharge opening.

What is claimed is:

1. A coffee maker comprising a housing and a substantially U-shaped water tank formed as a unitary plastic part, the housing having a horizontal base and a wall extending perpendicularly to said base, the water tank extending horizontally from the upper portion of said wall; a filter device, the limbs of the U embracing the filter device; a flow heater for heating water from the water tank and feeding the same to the filter device; means for mounting the flow heater on the rear side of said housing wall; and a cover for enclosing the mounted flow heater.

* * * * *